United States Patent [19]

Yuki

[11] 4,021,235
[45] May 3, 1977

[54] OPERATING METHOD FOR SLAG CLEANING FURNACE IN COPPER REFINING

[75] Inventor: Toshihiro Yuki, Saganoseki, Japan

[73] Assignee: Nihon Kogyo Kabushiki Kaisha, Tokyo, Japan

[22] Filed: Oct. 28, 1975

[21] Appl. No.: 625,803

[30] Foreign Application Priority Data

Oct. 28, 1974 Japan ............................ 49-123324

[52] U.S. Cl. ...................................... 75/72; 75/24; 75/63
[51] Int. Cl.² ..................... C22B 15/00; C21B 3/04
[58] Field of Search ............... 75/72, 24, 63, 89, 65

[56] References Cited

UNITED STATES PATENTS

| 1,416,262 | 5/1922 | Butler et al. | 75/24 |
| 2,295,219 | 9/1942 | Kalling et al. | 75/24 |
| 2,857,263 | 10/1958 | Anderson | 75/24 |

*Primary Examiner*—Walter R. Satterfield
*Attorney, Agent, or Firm*—Seidel, Gonda & Goldhammer

[57] ABSTRACT

A process is provided for recovering in a slag cleaning furnace the copper from smelting furnace slags discharged from a smelting furnace for copper refinery, said process being characterized in that zinc removed tailings are charged into said slag smelting furnace in an either continuous or discontinuous manner, whereby the copper recovery may be improved and valuable metals may also be recovered from the said tailings.

11 Claims, No Drawings

OPERATING METHOD FOR SLAG CLEANING FURNACE IN COPPER REFINING

BACKGROUND OF THE INVENTION

The present invention relates to a process for recovering copper from slags discharged from a pyritic smelting furnace such as a flash smelting furnace in copper refining. More specifically, the invention relates to a process for recovering copper from slags of the copper smelting furnace, utilizing zinc removed tailings in which the zinc residue or crust has had the zinc content recovered therefrom, said zinc residue having been discharged as distillation furnace residue or leaching residue during the zinc refinery.

Since there is usually about 1 percent of copper content in slags (hereinafter referred to as smelting furnace slag) discharged from a smelting furnace such as a flash smelting furnace, blast furnace or reverberatory furnace, it is required to recover the copper in some way or other to improve the yield of copper in a copper refining furnace. To this end several methods have heretofore been employed to recover the copper by providing a slag treating furnace (hereinafter referred to as slag cleaning furnace) such as an electric furnace or the like following the smelting furnace. According to one of the methods, the copper containing matte particles mixed in the smelting furnace slag are allowed to settle down by maintaining said slag at an elevated temperature for a period of time. There is another more positive conventional method of enhancing the copper recovery in which the slag is maintained at a high temperature in the slag smelting furnace while blocks or powders of pyrite or copper containing pyrite are added to the slag so that the matte particles suspended in the smelting furnace slag and containing copper are caused to co-precipitate along with the pyrite as it settles.

However, the method relying on the gravity settling of fine matte particles is inadequate in the copper recovery. The method based on the addition of pyrite or the like is considerably more effective with respect to the recovery of copper, but it is still not entirely satisfactory and has the drawbacks as will be mentioned below. When the pyrite or copper containing pyrite to be added is in the form of powder, it is necessary to blow such powdered ore into the melt of smelting furnace slag to promote the smooth reaction, for which purpose special equipment is required. Furthermore, dusts will inevitably be involved. When ore in the form of grains is used, it may be charged into the slag by gravity, requiring no special equipment, but the reaction rate is slow. A further disadvantage of the method by the addition of pyrite or copper containing pyrite is that due to the technique of co-precipitating the copper containing matte particles along with the pyrite, the so separated and recovered matte is of a low grade with respect to the copper so that a greater burden is imposed on a converter in a subsequent treating process. Still another drawback to this method is that it requires a great amount of energy to maintain the slag smelting furnace at an elevated temperature. For example, when the heating method by the use of graphite electrodes is employed, electric power of 80 KWH per a ton of smelting furnace slag to be treated is required.

On the other hand, in the zinc refinery the zinc residue containing gold, silver and copper is discharged as zinc distillation furnace residue and leaching residue in the pyro- and hydrometallurgical refining process, respectively. Since these zinc residues have a high percent of copper content, they are subjected to either a hydrometallurgical treatment or a pyrometallurgical treatment to recover the zinc. Typical of the pyrometallurgical treatment is the Waelz process in which the zinc recovery is effected by fuming. In the case of the distillation residue, a method is employed in which the zinc residue is subjected to magnetic separation and the non-magnetics containing a high percent of zinc content are repeatedly treated in a zinc refining process. The residue subjected to such treatment is discharged as Waelz process tailings or magnetically separated tailings. The tailings, which are herein termed "zinc removed tailings", remaining after zinc has been recovered from the zinc residue in a zinc refining process as described above contain values such as gold, silver, copper and the like, metallic iron and silicon. An example of the composition is shown below in Table I.

Table I

| ingredients | Au | Ag | Cu | Fe | Zn | Si | C |
|---|---|---|---|---|---|---|---|
| contents | 2.7g/T | 600g/T | 4.8% | 58% | 2.5% | 8% | 3% |

Heretofore, such zinc removed tailings have been treated in a copper refining furnace, mostly in a smelting furnace or converter for recovery of the valuable metals therefrom. However, when the treatment is carried out in a smelting furnace, the reduction atmosphere prevailing in the furnace prevents the iron from adequately falling into slags, necessitating the limitation of the amount of the tailings to be treated. In the case where the treatment is effected in a converter, as the amount of the zinc recovered tailings to be treated is increased, there is correspondingly a decrease in the amount of the matte to be treated which is the original object of treatment by the converter. Consequently, from a stand-point of productivity, there is a limit in treating the zinc removed tailings by a converter. Thus, it cannot be said that any of the conventional treatment methods is effective.

In an attempt to overcome the foregoing drawbacks to the prior art methods of recovering copper from smelting furnace slags, the present inventor has discovered that in refining the smelting furnace slags in a slag cleaning furnace, the introduction of a charge of zinc removed tailings into the slags provide salient effects in copper recovery and economy of electric energy as well as making it possible to recover very effectively the valuable metals contained in the zinc removed tailings.

Based on this discovery, the present invention provides a process of recovering the copper contained in smelting furnace slags and concurrently recovering valuable metals such as gold, silver, copper and others in zinc removed tailings.

DETAILED DESCRIPTION OF THE PREFERRED EMBODIMENT

In treating smelting slags in a slag cleaning furnace, the present invention comprises introducing into the slag cleaning furnace a charge of zinc removed tailings resulting from the zinc refinery. The zinc removed tailings employed herein may be in the form of either grains or powder. The zinc removed tailings may advantageously be charged into the furnace by gravity. Although the location at which the zinc removed tailings are gravity dropped into the slag cleaning furnace is not critical, it is preferable that the tailings be charged into the furnace adjacent the charging port thereof. The zinc removed tailings may be used either alone or in combination with either one or both of pyrite and copper containing pyrite. A charge of zinc recovered tailings may preferably be in an amount of 0.02 to 0.03 parts per 1 part of smelting furnace slag. When employed together with zinc recovered tailings, pyrite or copper containing pyrite may preferably be in an amount of 0.02 to 0.03 parts per 1 part of the smelting furnace slag. With an increase in quantity of the added pyrite or copper containing pyrite, the recovery of copper is enhanced whereas the copper content in the matte is lowered. The zinc removed tailings may be charged either continuously or discontinuously. The operating conditions of the slag cleaning furnace including the operating temperature and others may be the same as in the conventional process wherein only the pyrite is used.

The silicon and carbon contained in the zinc removed tailings employed in this invention react with the magnetite to rapidly decompose the latter and allow it to float separated from the copper sulfide, thus greatly contributing to effective recovery of copper. The use of pyrite or material containing pyrite such as copper containing pyrite in combination with the zinc removed tailings provides a higher copper recovery than the use of the zinc removed tailings alone. In the conventional process wherein pyrite alone is employed, if copper containing pyrite is used in an amount of about 4 percent relative to the amount of the smelting furnace slag to be treated, the copper content of the recovered matte is only on the order of 30 to 40 percent. In contrast, the use of copper containing pyrite and zinc removed tailings, each in an amount of 2 percent relative to the amount of the smelting furnace slag will produce the recovered matte having 40 to 50 percent of copper content, enabling an efficient operation of the converter for subsequent processes.

Since the oxidizing atmosphere is prevailing in the slag cleaning furnace, the oxidization of the iron in the zinc removed tailings is not prevented, so that a large quantity of zinc removed tailings can be employed to recover valuable metals, which are collected in the matte in the slag cleaning furnace. Thereafter, the matte is desulfured to produce blister copper containing gold and silver, said blister copper being subjected to an electrolytic process to separate the copper from the gold and silver. Finally, the gold and silver are separated by a silver-gold separation process. In this instance, 90 percents of the copper, 90 percent of the silver and 56 percent of the gold contained in the zinc removed tailings can be recovered.

Furthermore, according to this invention, the energy required to heat the slag cleaning furnace may be greatly reduced. The conventional process required electric power of 80 KWH per 1 ton of the smelting furnace slag to be treated while the present process requires electric power of only 30 KWH/T, enabling the use of an electric power unit smaller by more than 60 percent in capacity, since the exothermic elements such as metallic iron, silicon and others contained in the zinc removed tailings can be effectively utilized according to the present invention.

It is to be appreciated from the foregoing that the present invention is effective in recovering not only the copper contained in the slag resulting from the copper refinery but also the valuable metals in the zinc removed tailings and that it is of great service to the copper and zinc refineries in that the exothermic elements can be effectively utilized.

The invention will be described more specifically with reference to the working examples hereinbelow.

EXAMPLE 1

Flash smelting furnace slag having 1 – 2% or 1.6% on the average of copper content was substantially continuously charged into a slag cleaning furnace having a hearth area of 60 m$^2$ at a rate of 500 T/day, and copper containing pyrite and magnetically separated residue in the form of grains were charged each at a rate of 10 T/day. The charge was effected through a chute disposed adjacent the port of the slag cleaning furnace. The portion of the slag cleaning furnace adjacent said port was heated to a temperature of around 1250° C employing Soderberg electrodes. The operation was run under these operating conditions for ten consecutive days. The average copper content in the slag treated in the slag cleaning furnace was 0.48% and the copper content in the matte produced was 45% on the average. The electric power used was of 28 KWH per ton of the slag treated in the slag cleaning furnace. The zinc removed tailings used contained 2.7g of gold/T, 600 g of silver/T and 4.8% of copper, and 88.6% of the copper, 89.1% of the silver and 56.5% of the gold were collected in the matte.

EXAMPLE 2

The operation was carried out under the same conditions as in Example 1 except that pyrite and magnetically separated residue in the form of grains were charged at a rate of 15 T/day and 10 T/day, respectively. The copper content in the slag treated in the slag cleaning furnace was 0.45% on the average while the copper content in the matte obtained was 43.7% on the average.

EXAMPLE 3

The operation was run under the same conditions as in Example 1 except that magnetically separated residue was charged into the furnace at a rate of 15 T/day. The resultant copper content in the slag was 0.50% on the average while the matte having an average 47% of copper content was obtained. The electric power used was 30 KWH per ton of the smelting furnace slag treated.

While the present invention has been described by reference to particularly embodiments thereof, it should be understood that the invention lends itself to variations and modifications which would be obvious to those skilled in the art.

What is claimed is:

1. In a process for recovering copper from slag discharged from a copper smelting furnace, wherein the slag is heated in a slag cleaning furnace to enhance copper recovery, the improvement comprising adding to the slag in the slag cleaning furnace zinc removed tailings previously produced by removing zinc from the residue discharged from a zinc refining process.

2. A process according to claim 1 wherein said zinc removed tailings are added to said slag in an amount of 0.02 to 0.03 parts zinc removed tailings per one part of slag.

3. A process according to claim 1 wherein the zinc removed tailings and slag are heated to about 1250° C to form a high copper content matte.

4. A process according to claim 3 wherein said matte has a copper content of from about 43.7% to about 47%.

5. A process according to claim 1 wherein said zinc removed tailings are introduced into said slag cleaning furnace in a continuous manner.

6. A process according to claim 1 wherein a reactant selected from the group consisting of pyrite and copper containing pyrite is added with said zinc removed tailings to said slag cleaning furnace.

7. A process according to claim 6 wherein said reactant is added to said slag in an amount of 0.02 to 0.03 parts of said reactant to one part of said slag.

8. A process according to claim 1 wherein said zinc removed tailings are produced by removing zinc from the residue discharged from a distillation furnace in a pyrometallurgical process of refining zinc.

9. A process according to claim 1 wherein said zinc removed tailings are produced by removing zinc from the residue discharged as leaching residue in a hydrometallurgical process of refining zinc.

10. A process according to claim 1 wherein gold and silver are removed from the zinc removed tailings in the slag.

11. A process according to claim 1 wherein said zinc removed tailings comprise about 2.7 grams per ton of gold, about 600 grams per ton of silver, about 4.8 percent copper, about 58 percent iron, about 2.5 percent zinc, about 8 percent silicon and about 3 percent carbon.

* * * * *